United States Patent
Lee et al.

(10) Patent No.: US 10,540,964 B2
(45) Date of Patent: Jan. 21, 2020

(54) METHOD AND APPARATUS FOR PROCESSING NATURAL LANGUAGE, METHOD AND APPARATUS FOR TRAINING NATURAL LANGUAGE PROCESSING MODEL

(71) Applicant: SAMSUNG ELECTRONICS CO., LTD., Suwon-si (KR)

(72) Inventors: Sangho Lee, Osan-si (KR); Hyoungmin Park, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 183 days.

(21) Appl. No.: 15/598,966

(22) Filed: May 18, 2017

(65) Prior Publication Data
US 2018/0137855 A1 May 17, 2018

(30) Foreign Application Priority Data
Nov. 16, 2016 (KR) .................. 10-2016-0152712

(51) Int. Cl.
| | | |
|---|---|---|
| G10L 15/00 | (2013.01) | |
| G10L 15/18 | (2013.01) | |
| G06F 17/27 | (2006.01) | |
| G10L 15/02 | (2006.01) | |
| G10L 15/06 | (2013.01) | |

(Continued)

(52) U.S. Cl.
CPC ...... *G10L 15/1815* (2013.01); *G06F 17/2735* (2013.01); *G10L 15/02* (2013.01); *G10L 15/063* (2013.01); *G10L 15/14* (2013.01); *G10L 15/16* (2013.01); *G10L 15/19* (2013.01); *G06F 17/2785* (2013.01); *G10L 15/20* (2013.01);

(Continued)

(58) Field of Classification Search
CPC combination set(s) only.
See application file for complete search history.

(56) References Cited

U.S. PATENT DOCUMENTS

| | | | |
|---|---|---|---|
| 7,698,131 B2 | 4/2010 | Bennett | |
| 8,731,945 B2 | 5/2014 | Potter | |

(Continued)

FOREIGN PATENT DOCUMENTS

| | | |
|---|---|---|
| JP | 2016-110284 A | 6/2016 |
| KR | 10-0591655 B1 | 6/2006 |

(Continued)

OTHER PUBLICATIONS

Xie, Ziang, et al., "Neural Language Correction with Character-Based Attention," arXiv preprint arXiv:1603.09727, Cornell Library, Mar. 2016 (10 pages in English).

(Continued)

*Primary Examiner* — Vu B Hang
(74) *Attorney, Agent, or Firm* — Cha & Reiter, LLC.

(57) ABSTRACT

A natural language processing method and corresponding apparatus are disclosed. The natural language processing method may include converting words in sentence data, recognized through voice recognition, to corresponding word vectors, and converting characters in the sentence data to corresponding character vectors. The natural language processing method also may include generating a sentence vector based on the word vectors and the character vectors, and determining intent information of the sentence data based on the sentence vector.

19 Claims, 13 Drawing Sheets

(51) Int. Cl.
*G10L 15/14* (2006.01)
*G10L 15/16* (2006.01)
*G10L 15/19* (2013.01)
*G10L 15/22* (2006.01)
*G10L 15/20* (2006.01)

(52) U.S. Cl.
CPC ........ *G10L 15/22* (2013.01); *G10L 2015/025* (2013.01)

(56) References Cited

U.S. PATENT DOCUMENTS 8,892,488 B2    11/2014  Qi et al.
2012/0246133 A1  9/2012  Hsu et al.

FOREIGN PATENT DOCUMENTS

| KR | 10-1163411 B1 | 7/2012 |
| KR | 10-1233606 B1 | 2/2013 |
| KR | 10-2015-0023293 A | 3/2015 |
| KR | 10-2016-0013710 A | 2/2016 |
| KR | 10-2016-0069329 A | 6/2016 |
| WO | WO 01/84535 A2 | 11/2001 |

OTHER PUBLICATIONS

European Search Report dated Feb. 8, 2018 in corresponding European Application No. 17182953.4 (11 pages in English).

METHOD AND APPARATUS FOR PROCESSING NATURAL LANGUAGE, METHOD AND APPARATUS FOR TRAINING NATURAL LANGUAGE PROCESSING MODEL

CROSS-REFERENCE TO RELATED APPLICATION(S)

This application claims the benefit under 35 USC § 119(a) of Korean Patent Application No. 10-2016-0152712 filed on Nov. 16, 2016, in the Korean Intellectual Property Office, the entire disclosure of which is incorporated herein by reference for all purposes.

BACKGROUND

1. Field

The following description relates to a method and apparatus to process a natural language.

2. Description of Related Art

Voice recognition is a technology to recognize a voice or a speech of a user. In voice recognition, a human voice is converted to a text. However, in response to a word enunciated that is not properly recognized during the voice recognition, errors occur during recognition of the voice and conversion of the voice to an accurate text.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In accordance with an embodiment, there may be provided a natural language processing method, including: converting words in sentence data, recognized through voice recognition, to corresponding word vectors; converting characters in the sentence data to corresponding character vectors; generating a sentence vector based on the word vectors and the character vectors; and determining intent information of the sentence data based on the sentence vector.

The generating of the sentence vector may include: generating a concatenation vector of each of the words by concatenating a word vector of each of the words and a character vector of each of characters in each of the words; and generating the sentence vector by concatenating corresponding concatenation vectors of the words.

The converting of the words to the word vectors may include: in response to an unlabeled word being among the words, converting a word corresponding to the unlabeled word to a word vector corresponding to an unknown word vector.

The determining of the intent information may include: calculating a probability of each of pieces of candidate intent information determined from the sentence vector; and determining the intent information among the pieces of candidate intent information based on the calculated probability of each of the pieces of candidate intent information.

The determining of the intent information may include: determining a target word corresponding to an error word in the sentence data based on a concatenation vector of the error word; and recognizing the error word as the target word, wherein the concatenation vector of the error word may be generated by concatenating a word vector of the error word and a character vector of each of characters in the error word.

In response to the error word being an unlabeled word, the word vector of the error word corresponds to an unknown word vector.

The intent information may be generated by a natural language processing model receiving the sentence vector.

In response to the natural language processing model receiving training data including a second word generated by applying noise to a first word, the natural language processing model may be trained to recognize the second word as the first word.

The second word may be generated by changing a portion of characters in the first word to other characters, or adding another character to the first word.

The natural language processing method may also include: receiving a voice signal; extracting features from the received voice signal; recognizing a phoneme sequence from the extracted features through an acoustic model; and generating the sentence data by recognizing words from the phoneme sequence through a language model.

In accordance with another embodiment, there may be provided a training method including: generating a changed word by applying noise to a word in sentence data; converting the changed word and another word to which noise may be not applied to corresponding word vectors; converting characters in the changed word and characters in the other word to corresponding character vectors; and generating a sentence vector based on the word vectors and the character vectors.

The generating of the sentence vector may include: generating a concatenation vector of the changed word by concatenating the word vector of the changed word and a character vector of each of the characters in the changed word; generating a concatenation vector of the other word by concatenating the word vector of the other word and a character vector of each of the characters in the other word; and generating the sentence vector by concatenating the concatenation vector of the changed word and the concatenation vector of the other word.

The changed word may be generated by changing a character in the word to another character, or adding another character to the word.

The generating of the changed word may include: determining a character to be changed among characters in the word based on a standard; selecting another character from a dictionary; and replacing the determined character with the selected other character.

The standard may be determined based on a length of the word, a number of characters to be changed, and a position of each character to be changed.

In response to the changed word being an unlabeled word, the word vector of the changed word corresponds to an unknown word vector.

The training method may also include: randomly selecting the word from words in the sentence data.

The training method may also include: training a neural network-based natural language processing model based on the sentence vector.

In accordance with an embodiment, there may be provided a natural language processing apparatus including: a controller; and a memory including at least one instruction executable by the controller, wherein, in response to the instruction being executed by the controller, the controller may be configured to convert words in sentence data recognized through voice recognition to corresponding word vectors, convert characters in the sentence data to corresponding character vectors, generate a sentence vector based on the word vectors and the character vectors, and determine intent information of the sentence data based on the sentence vector.

In accordance with another embodiment, there may be provided a training apparatus including: a controller; and a memory including at least one instruction executable by the controller, wherein, in response to the instruction being executed by the controller, the controller may be configured to generate a changed word by applying noise to a word in sentence data, convert the changed word and another word to which noise may be not applied to corresponding word vectors, convert characters in the changed word and characters in the other word to corresponding character vectors, and generate a sentence vector based on the word vectors and the character vectors.

In accordance with a further embodiment, there may be provided a training method, including: randomly selecting a word in a sentence data, and apply noise to the selected word to generate a changed word; converting the changed word and another word, to which noise may be not applied, to corresponding word vectors, wherein in response to the changed word being an unidentifiable word, the changed word may be converted to an unknown word vector; converting characters in the changed word and characters in the other word to corresponding character vectors; generating a concatenation vector of the changed word by concatenating the corresponding word vector or the unknown word vector of the changed word and the character vectors of the characters in the changed word; generating a concatenation vector of the other word by concatenating the corresponding word vector of the other word and the character vectors of the characters in the other word; and generating a sentence vector by concatenating the concatenation vector of the changed word and the concatenation vector of the other word.

The training apparatus may be further configured to train a natural language processing model using the sentence vector.

The training apparatus trains the natural language processing model to determine intent information of the sentence data including the changed word by performing a forward computation on the sentence data.

The training apparatus trains the natural language processing model to perform a forward computation based on a concatenation vector of the changed word or the character vectors of each of the characters in the changed word to recognize the changed word as a target word.

In accordance with another embodiment, there is provided a training apparatus, including: a noise applier configured to randomly select a word in a sentence data, and apply noise to the selected word to generate a changed word; a word embedder configured to covert the changed word and another word, to which noise may be not applied, to corresponding word vectors, wherein in response to the changed word being an unidentifiable word, the word embedder converts the changed word to an unknown word vector; a character embedder configured to covert characters in the changed word and characters in the other word to corresponding character vectors; and a combiner configured to generate a concatenation vector of the changed word by concatenating the corresponding word vector or the unknown word vector of the changed word and the character vectors of each of the characters in the changed word, generate a concatenation vector of the other word by concatenating the correspond word vector of the other word and the character vectors of each of the characters in the other word, and generate a sentence vector by concatenating the concatenation vector of the changed word and the concatenation vector of the other word.

Other features and aspects will be apparent from the following detailed description, the drawings, and the claims.

Figure 1:
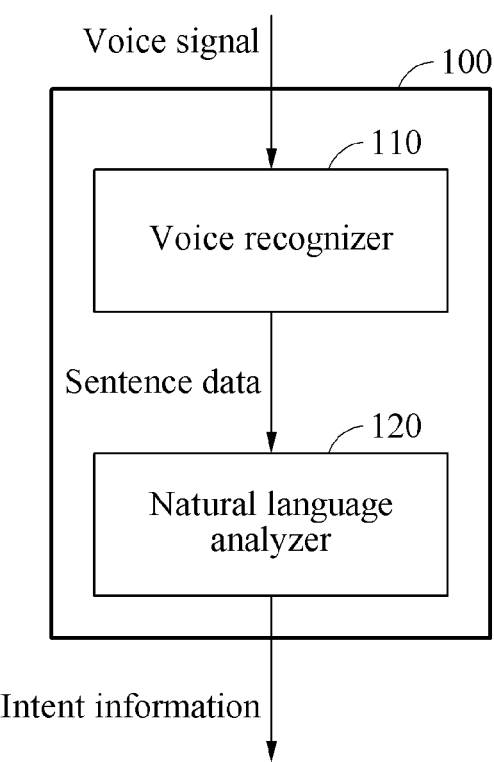
FIG. 1 is a diagram illustrating an example of a natural language processing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 is a diagram illustrating an example of a natural language processing apparatus.

Referring to FIG. 1, a natural language processing apparatus 100 includes a voice recognizer 110 and a natural language analyzer 120.

The natural language processing apparatus 100 receives a voice signal. The natural language processing apparatus 100 may be configured as a processor or a server, and receives a voice signal from a user through a user terminal and a network. For example, the natural language processing apparatus 100 may receive a voice signal being "send a photo to my father" from the user terminal.

The voice recognizer 110 generates sentence data by recognizing the voice signal through voice recognition. For example, the voice recognizer 110 generates sentence data of the voice signal as "send a photo to my father" by recognizing the voice signal "send a photo to my father" through voice recognition. The voice recognizer 110 will be described in greater detail with reference to FIG. 2.

The natural language analyzer 120 receives the sentence data from the voice recognizer 110. The natural language analyzer 120 performs at least one of morphemic analysis, syntactic analysis, semantic analysis, or discourse analysis on the sentence data. Through such an analysis, the natural language analyzer 120 determines intent information of the sentence data. For example, the natural language analyzer 120 determines the intent information of the sentence data to mean "transmit a photo to a terminal of my father" by analyzing the sentence data "send a photo to my father." For instance, the term "send" is analyzed to mean or direct "retrieve and transmit" the photo of my father.

In an example in which the voice recognizer 110 is unable to accurately recognize the voice signal due to ambient noise, low magnitude voice signal, or other problem, the natural language analyzer 120 predicts intent information of the sentence data generated. For example, the natural language analyzer 120 predicts intent information of the sentence data including an error word, which is a word that is generated due to an inaccurate recognition of the voice recognizer $110_{[AC1]}$. The natural language analyzer 120 will be described in greater detail with reference to FIG. 3.

The natural language analyzer 120 generates result information based on the intent information. For example, in a case that the natural language analyzer 120 analyzes the sentence data "send a photo to my father" and determines the intent information of the sentence data to be "transmit a photo to a terminal of my father," the natural language analyzer 120 generates a control signal corresponding to "transmit a photo to a terminal of my father."

The natural language processing apparatus 100 transmits the generated result information. For example, the natural language processing apparatus 100 transmits the control signal corresponding to "transmit a photo to a terminal of my father" to the user terminal. Through an operation based on the control signal, the user terminal then generates or outputs a photo to a terminal of the father to the user.

Figure 2:
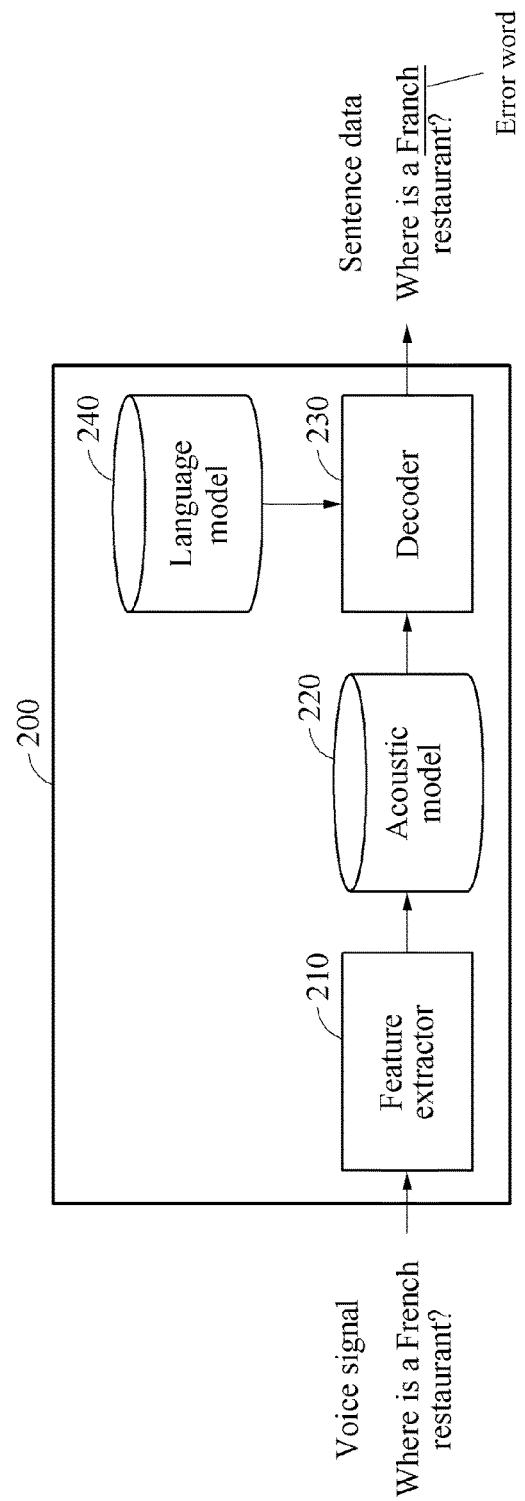
FIG. 2 is a diagram illustrating an example of a voice recognizer.

FIG. 2 is a diagram illustrating an example of a voice recognizer.

Referring to FIG. 2, a voice recognizer 200 includes a feature extractor 210, an acoustic model 220, a decoder 230, and a language model 240.

The voice recognizer 200 receives a voice signal as an input. In the example illustrated in FIG. 2, the voice recognizer 200 receives a voice signal "Where is a French restaurant?"

The feature extractor 210 extracts features$_{[AC2]}$ or feature vectors from the voice signal. The feature extractor 210 extracts the features or the feature vectors from the voice signal using, for example, a linear predictive coding (LPC) method or a mel-frequency cepstral coefficient (MFCC) method.

The acoustic model 220 recognizes phonemes from the features. The acoustic model 220 may be, for example, a dynamic time warping (DTW)-based acoustic model and a hidden Markov modeling (HMM)-based acoustic model. However, the acoustic model 220 is not limited to the examples described in the foregoing.

The decoder 230 generates sentence data by recognizing words from the phonemes through the language model 240. The language model 240 may be, for example, an n-gram language model and a neural network-based model. However, the language model 240 is not limited to the examples described in the foregoing.

The voice recognizer 200 may not accurately recognize the voice signal due to an influence of noise or other ambient factors. That is, an error in voice recognition may occur. For example, the voice recognizer 200 may not accurately recognize the voice signal "Where is a French restaurant?" and may instead generate sentence data "Where is a Franch restaurant?" The sentence data "Where is a Franch restaurant?" includes an error word or an error in the word "Franch." In such an example, intent information of the sentence data may not be accurately determined. A natural language analyzer (to be illustrated and described in FIG. 3) predicts the intent information of the sentence data "Where is a Franch restaurant?" to be searching for a French restaurant. The natural language analyzer will be described in greater detail with reference to FIG. 3.

Figure 3:
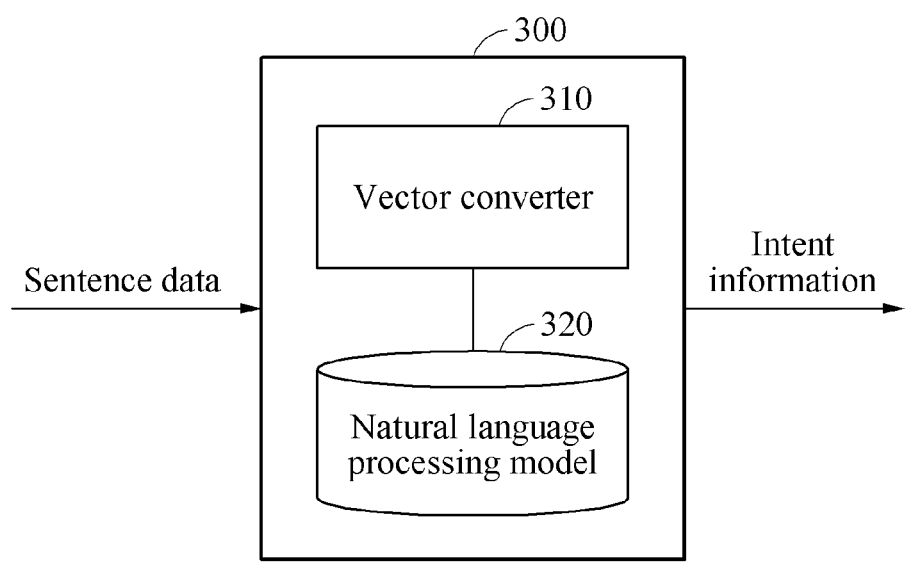
FIG. 3 is a diagram illustrating an example of a natural language analyzer.

FIG. 3 is a diagram illustrating an example of a natural language analyzer.

Referring to FIG. 3, a natural language analyzer 300 includes a vector converter 310 and a natural language processing model 320.

The natural language analyzer 300 receives sentence data from a voice recognizer (such as the voice recognizer 200 illustrated and described with respect to FIG. 2). In the example illustrated in FIG. 3, the natural language analyzer 300 receives sentence data "Where is a Franch restaurant?" from the voice recognizer.

The vector converter 310 converts words in the sentence data to corresponding word vectors. For example, the vector converter 310 converts each of the words, for example, "where," "is," "a," "Franch," and "restaurant," in the sentence data "Where is a Franch restaurant?" to a word vector using word embedding. The word vector may be a real number vector. The word vector may be, for example, a one-hot vector or a distributional vector.

The sentence data may include an unlabeled word. The unlabeled word refers to a word for which a vector is not defined. In response to the sentence data including such an unlabeled word, the vector converter 310 processes the unlabeled word to be 'unknown'. For example, in a case of "Franch" being the unlabeled word, the vector converter 310 processes "Franch" to be 'unknown' and converts "Franch" to a word vector corresponding to 'unknown'. The word vector corresponding to unknown is also referred to a word vector corresponding to an unknown word vector. The unknown word vector refers to a constant vector or a predefined vector, such as, for example, [0,0,0,0,0,0,0,1]. However, the unknown word vector is not limited to the example described in the foregoing.

The word vector is represented as [word]. Table 1 illustrates a word vector of each of the words in the sentence data "Where is a Franch restaurant?"

TABLE 1

| Word | Word vector |
| --- | --- |
| Where | [Where] |
| is | [is] |
| a | [a] |
| Franch | [Franch] |
| restaurant | [restaurant] |

The vector converter 310 converts characters of the sentence data to corresponding character vectors. For example, the vector converter 310 converts each of the characters, for example, "W," "h," "e," "r," "e," ..., "r," "e," "s," "t," "a," "u," "r," "a," "n," and "t," of the sentence data "Where is a Franch restaurant?" to a character vector using character embedding. The character vector may be a real number or alpha-numeric vector. The character vector may be, for example, a one-hot vector or a distributional vector.

The character vector is represented as [character]. Table 2 illustrates a character vector of each of the characters of the sentence data "Where is a Franch restaurant?"

TABLE 2

| Character | Character vector |
| --- | --- |
| W | [W] |
| h | [h] |
| e | [e] |
| ... | ... |
| F | [F] |
| r | [r] |
| a | [a] |
| n | [n] |
| ... | ... |
| a | [a] |
| n | [n] |
| t | [t] |

The vector converter 310 generates a sentence vector of the sentence data based on the word vectors and the character vectors. In one example, the vector converter 310 generates a concatenation vector by concatenating a word vector of each of the words in the sentence data and a character vector of each of characters included in the words in the sentence data. The vector converter 310 generates the sentence vector by concatenating corresponding concatenation vectors of the words in the sentence data. The generating of the sentence vector will be described in greater detail with reference to FIG. 4.

The vector converter 310 inputs the sentence vector to the natural language processing model 320. The natural language processing model 320 may be a neural network-based model. To the natural language processing model 320, connection weights optimized through training or learning are applied. When the natural language processing model 320 receives the sentence vector as an input, the natural language processing model 320 determines intent information of the sentence data by performing forward computation on the sentence vector. The forward computation refers to computation performed in a direction of an input layer→a middle layer→an output layer of the natural language processing model 320. Through the forward computation, the intent information of the sentence data is generated at the output layer.

In one example, the sentence data may include an error word. If such is the case, the natural language processing model 320 determines the intent information of the sentence data including the error word by performing the forward computation on the sentence vector of the sentence data including the error word. The natural language processing model 320 performs the forward computation based on a concatenation vector of the error word or a character vector of each of characters included in the error word. The natural language processing model 320 recognizes the error word as a target word corresponding to the error word through the forward computation. In addition, the natural language processing model 320 determines the intent information of the sentence data by recognizing the error word as the target word.

For example, the natural language processing model 320 receives the sentence vector of the sentence data "Where is a Franch restaurant?" including an error word "Franch." The natural language processing model 320 predicts a concatenation vector of "French" [French][F][r][e][n][c][h] from a concatenation vector of the error word "Franch" [Franch] [F][r][a][n][c][h] based on the forward computation performed on the sentence vector of the sentence data "Where is a Franch restaurant?" In this example, in a case that [Franch] is a word vector corresponding to an unknown word vector, the natural language processing model 320 predicts the concatenation vector of "French" [French][F][r][e][n][c][h] from [F][r][a][n][c][h], which is a concatenation of character vectors of characters included in the error word "Franch". Although described hereinafter, the natural language processing model 320 includes a model that is trained in advance using training data including a word or words to which noise is applied. Thus, the natural language processing model 320 predicts [French][F][r][e][n][c][h] from [Franch][F][r][a][n][c][h] or [F][r][a][n][c][h]. The natural language processing model 320 determines a target word corresponding to "Franch" to be "French" through such a prediction. The natural language processing model 320 recognizes "Franch" as "French." The natural language processing model 320 determines the intent information of the sentence data "Where is a Franch restaurant?" to be 'searching for a French restaurant' by recognizing "Franch" as "French." The training of the natural language processing model 320 will be described in greater detail with reference to FIG. 7.

According to an embodiment, the natural language processing model 320 calculates a probability of each of pieces of candidate intent information determined from the sentence vector. The natural language processing model 320 determines the intent information of the sentence data among the pieces of candidate intent information based on the probability of each of the pieces of candidate intent information. For example, the natural language processing model 320 determines candidate intent information having a highest probability to be the intent information of the sentence data. In a case that an error word is included in the sentence data, candidate intent information determined when the error word is recognized as a target word may have a highest probability. The natural language processing model 320 determines the candidate intent information to be the intent information of the sentence data.

The natural language analyzer 300 generates result information corresponding to the intent information. For example, the natural language analyzer 300 generates a control signal for the 'searching for a French restaurant.' In addition, the natural language analyzer 300 replaces the error word for the target word. The natural language analyzer 300 generates sentence data corresponding to the intent information. For example, the natural language analyzer 300 generates the sentence data "Where is a French restaurant?" corresponding to the intent information by replacing "Franch" with "French." That is, the natural language analyzer 300 corrects the error word in the input sentence data to be the target word.

The natural language analyzer 300 transmits the result information to a user terminal transmitting the voice signal.

According to one example, the natural language analyzer 300 is robust against noise or an error in voice recognition, and improves accuracy in processing an error that may occur when converting a voice signal to text data.

Figure 4:
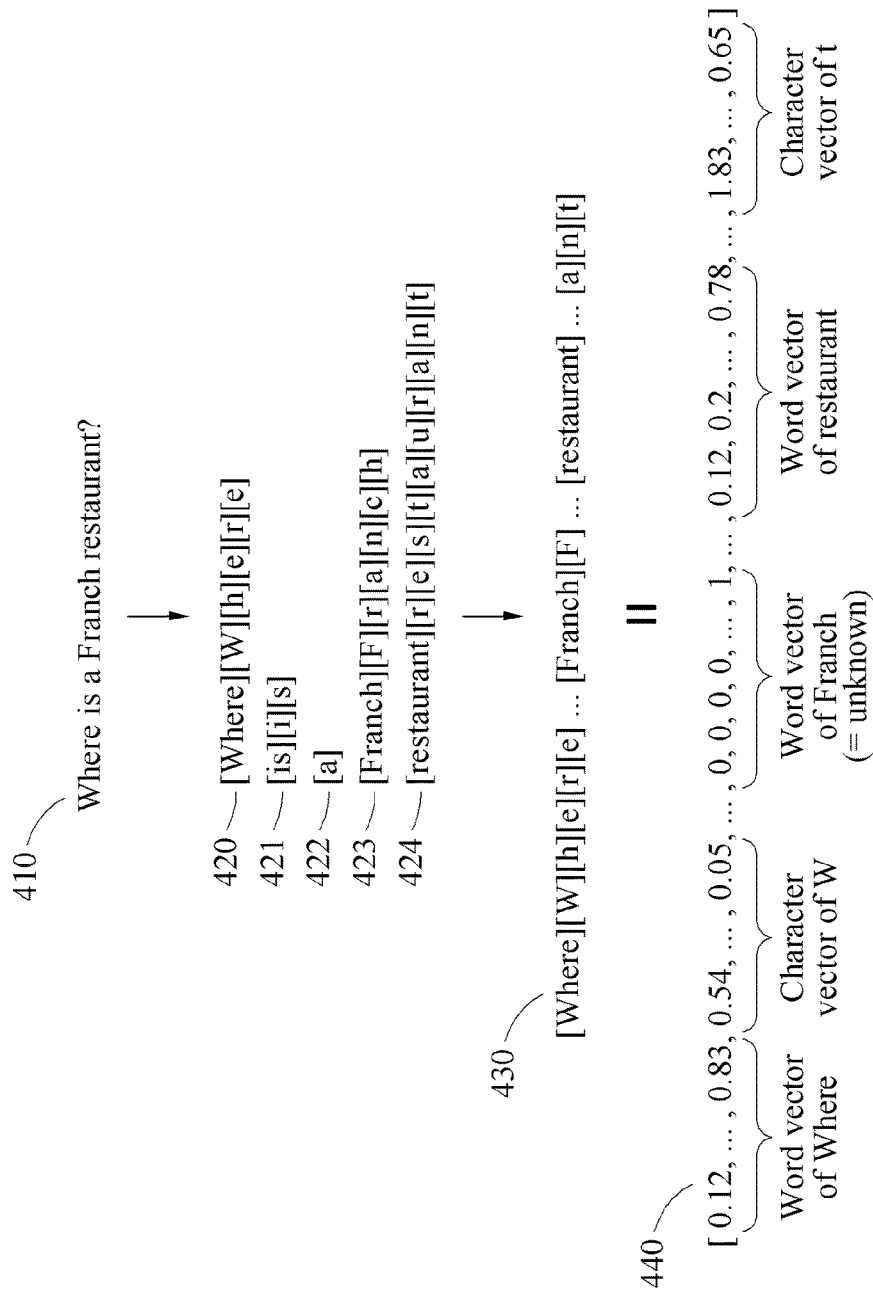
FIG. 4 is a diagram illustrating an example of a method to generate a sentence vector.

FIG. 4 is a diagram illustrating an example of a method to generate a sentence vector.

Referring to FIG. 4, the vector converter described with reference to FIG. 3 (the vector converter 310) generates corresponding concatenation vectors, for example, concatenation vectors 420, 421, 422, 423, and 424, for each of the words recognized in sentence data 410 "Where is a Franch restaurant?" The vector converter generates the concatenation vector 420 of "Where" by concatenating [Where], [W], [h], [e], [r], and [e]. As illustrated, the concatenation vector 420 of "Where" is [Where][W][h][e][r][e]. According to an embodiment, the concatenation vector 420 of "Where" may be [W][h][e][r][e][Where] or [W][Where][h][e][r][e]. However, the concatenation vector 420 of "Where" is not limited to the examples described in the foregoing. Similarly, the vector converter generates the concatenation vectors 421, 422, 423, and 424 of remaining words recognized in the sentence data 410 "Where is a Franch restaurant?" In an example, as described above, in response to "Franch" being an unlabeled word or an unidentifiable word, the vector converter converts "Franch" to a word vector corresponding to an unknown word vector. The vector converter generates the concatenation vector 423 of "Franch" by concatenating the word vector corresponding to the unknown word vector and character vectors corresponding to each of characters in "Franch."

The corresponding concatenation vectors 420 through 424 of the words in the sentence data 410 "Where is a Franch restaurant?" are illustrated as in FIG. 4.

The vector converter generates a sentence vector 430 by concatenating the concatenation vectors 420 through 424 of the words in the sentence data 410 "Where is a Franch restaurant?" As illustrated in FIG. 4, the vector converter generates the sentence vector 430, for example, [Where][W][h][e][r][e] ... [Franch][F] ... [restaurant] ... [a][n][t], of the sentence data 410 "Where is a Franch restaurant?" However, the sentence vector 430 of the sentence data 410 "Where is a Franch restaurant?" is not limited to the example described in the foregoing. Furthermore, although one word in the sentence data 410 is an unlabeled word or an unidentifiable word, the sentence data 410 may include multiple unlabeled words or unidentifiable words.

A real number vector 440 is also illustrated in FIG. 4. The real number vector 440 is a vector of a different form representing the sentence vector 430.

Figure 5:
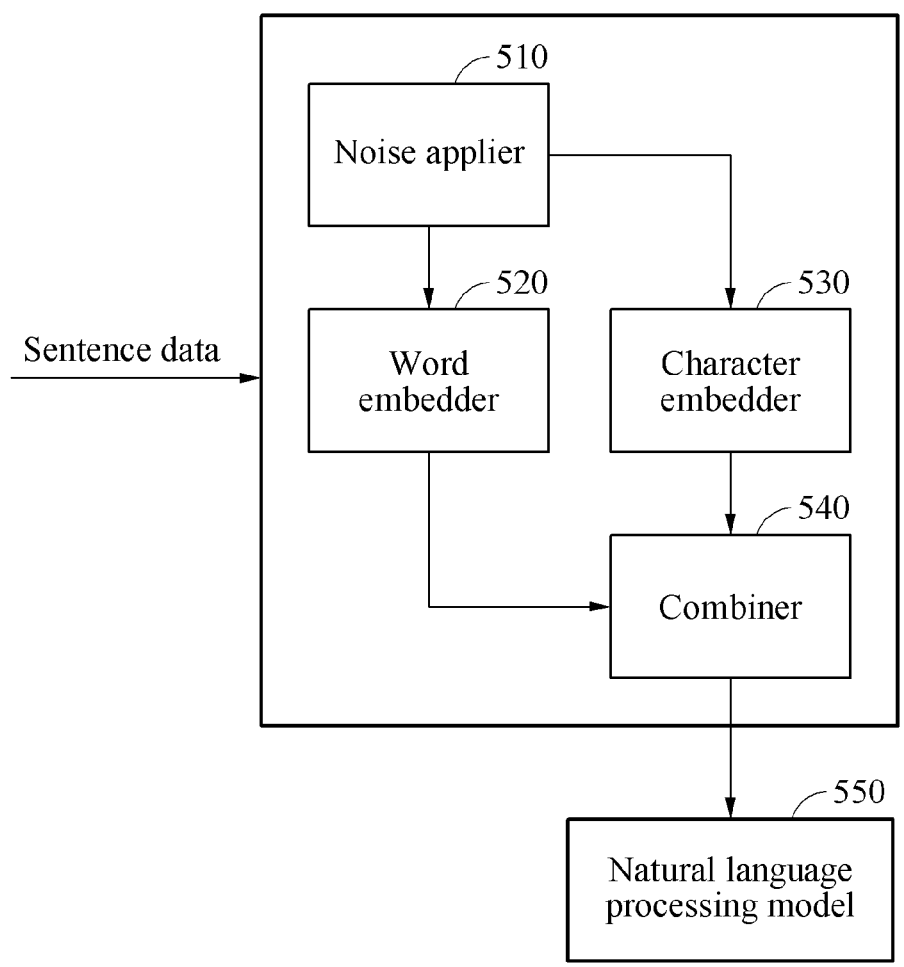
FIG. 5 is a diagram illustrating an example of a training apparatus.

FIG. 5 is a diagram illustrating an example of a training apparatus.

Referring to FIG. 5, a training apparatus 500 includes a noise applier 510, a word embedder 520, a character embedder 530, a combiner 540, and a natural language processing model 550.

For example, sentence data "Searching for a French food recipe" is input to the training apparatus 500. The sentence data is input as training data to the training apparatus 500.

The noise applier 510 generates a changed word by applying noise to a word in the sentence data. The noise applier 510 randomly selects at least one word among words in the sentence data, and applies noise to the selected word. That is, the noise applier 510 injects noise into the sentence data. For example, the noise applier 510 may select "French" and "recipe" from the sentence data "Searching for a French food recipe," and apply noise to "French" and "recipe." As a result of applying noise to the selected words, a character "e" positioned third in "French" may be changed to "a" and a changed word "Franch" may thus be generated. Similarly, as a result of applying noise to the selected words, a character "e" positioned sixth in "recipe" may be changed to "i" and a changed word "recipi" may thus be generated. The applying of the noise will be described in greater detail with reference to FIG. 6.

The word embedder 520 converts the changed word to a word vector, for example, through word embedding. In one example, in a case that the changed word is an unlabeled or an unidentifiable word, the word embedder 520 processes the changed word to be 'unknown' and converts the changed word to an unknown word vector.

The word embedder 520 converts another word to which noise is not applied to a word vector. For example, the word embedder 520 converts each of "Searching," "for," "a," and "food" to [Searching], [for], [a], and [food] word vectors. In a case that one or more of the other words in the sentence data is an unlabeled word or an unidentifiable word, the word embedder 520 converts the one or more of the other words in the sentence data to be an unknown word vector.

The character embedder 530 converts characters included in the changed word and characters included in the one or more of the other words to which the noise is not applied to corresponding character vectors. For example, the character embedder 530 converts characters "F," "r," "a," "n," "c," and "h" included in "Franch" to character vectors [F], [r], [a], [n], [c], and [h], respectively. In addition, the character embedder 530 converts characters "r," "e," "c," "i," "p," and "i" included in "recipi" to character vectors [r], [e], [c], [i], [p], and [i], respectively. Similarly, the character embedder 530 converts each character included in each of "Searching," "for," and "food" to corresponding character vectors.

The combiner 540 generates a sentence vector based on the corresponding word vectors of the changed word and the corresponding word vectors of the other word or words to which the noise is not applied, and the corresponding character vectors of the characters included in the changed word and the other word or words. In one example, the combiner 540 generates a concatenation vector of the changed word by concatenating the word vector of the changed word and a character vector of each of the characters included in the changed word. In addition, the combiner 540 generates a concatenation vector of each of the other words by concatenating a word vector for each of the other words and a character vector of each of the characters included in each of the other words. The combiner 540 generates the sentence vector by concatenating the concatenation vector of the changed word and the concatenation vector of each of the other words.

For example, the combiner 540 generates a sentence vector, for example, [Searching][S] . . . [Franch][F][r][a] . . . [recipe] . . . [i][p][e], by concatenating a concatenation vector of the changed word "Franch" and a concatenation vector of another word. In addition, the combiner 540 generates a sentence vector, for example, [Searching][S] . . . [French][F][r][e] . . . [recipi] . . . [i][p][i], by concatenating a concatenation vector of the changed word "recipi" and a concatenation vector of another word.

The generating of the sentence vector is described with reference to FIG. 4, and thus a more detailed and repeated description is omitted here for brevity.

The sentence vector generated by the combiner 540 corresponds to sentence data including noise, or sentence data including a word to which noise is applied. For example, the sentence vector [Searching][S] . . . [Franch] [F][r][a] . . . [recipe] . . . [i][p][e] may correspond to "Searching for a Franch food recipe." In addition, the sentence vector [Searching][S] . . . [French][F][r][e] . . . [recipi] . . . [i][p][i] may correspond to "Searching for a French food recipi." That is, another sentence data different from the sentence data input to the training apparatus 500, for example, "Searching for a Franch food recipe" and "Searching for a French food recipi," may be generated.

The training apparatus 500 trains the natural language processing model 550 using the sentence vector. That is, the training apparatus 500 trains the natural language processing model 550 through the sentence data including noise. Through such training, the natural language processing model 550 becomes more robust against noise, and increases accuracy in processing an error word in a case that the error word is included in sentence data.

The training of the natural language processing model 550 will be described in greater detail with reference to FIG. 7.

Figure 6:
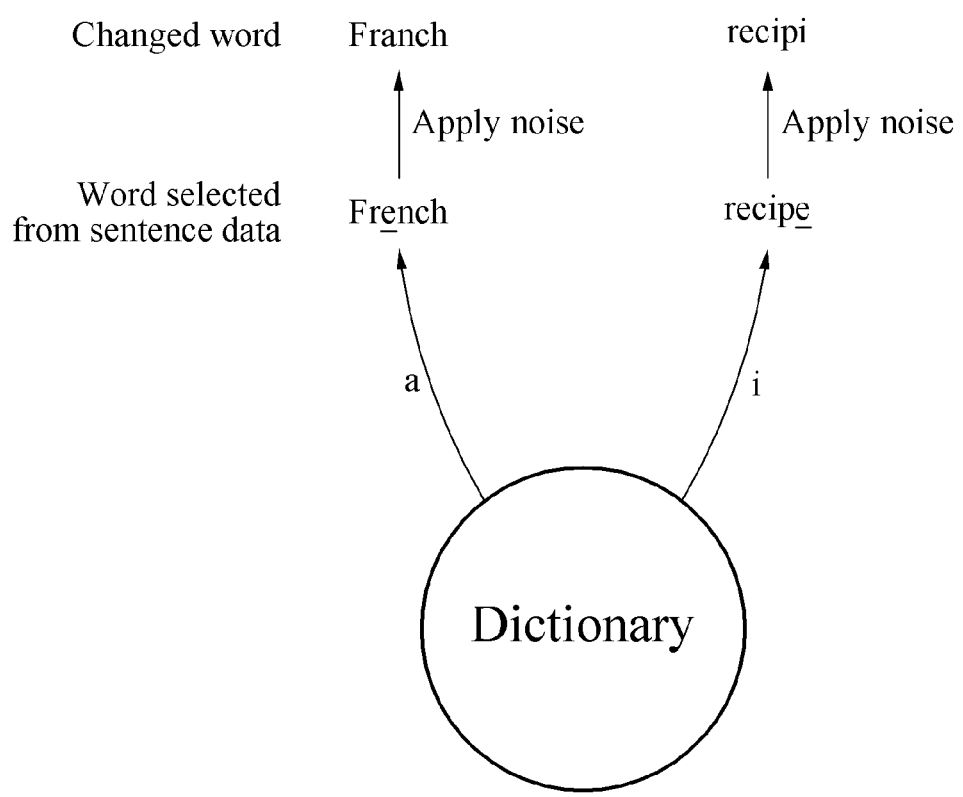
FIG. 6 is a diagram illustrating an example of a method to apply noise.

FIG. 6 is a diagram illustrating an example of a method of applying noise.

As described with reference to FIG. 5, the noise applier selects at least one word from sentence data. For example, the noise applier randomly selects at least one word. In addition, the noise applier applies noise to the selected word. In one example, the noise applier determines a character to be changed among characters included in the selected word based on a predetermined or predefined standard. The predefined standard would be based on statistical analysis performed of typical errors or mispronunciations of certain words in a particular language, such as English. Furthermore, the predefined standard would take in consideration whether typical mispronunciations performed by children, adults, or a person foreign to the English language$_{[AC3]}$. The predefined standard would also take into consideration ambient factors such as wind, background noises, or rain considered to affect the capturing of data. The noise applier selects a character from a predetermined dictionary, and replaces the determined character with the selected character. Table 3 illustrates the standard. However, the standard is not limited to the example illustrated in Table 3.

TABLE 3

| Word length (L) | Number of characters to be changed | Position of each character to be changed |
| --- | --- | --- |
| 2 ≤ L ≤ 6 | 1 | Random |
| 6 < L ≤ 10 | Less than or equal to 2 | Random |
| 10 < L ≤ 14 | Less than or equal to 3 | Random |
| . . . | . . . | . . . |

In the example illustrated in FIG. 6, the noise applier selects "French" and "recipe" from "Searching for a French food recipe." A length of "French" is 6 and, thus, the noise applier randomly selects a third position of "French" by referring to Table 3 and determines a character to be changed to be "e" corresponding to the third position of "French." In addition, a length of "recipe" is 6 and, thus, the noise applier randomly selects a sixth position of "recipe" by referring to Table 3 and determines a character to be changed to be "e" corresponding to the sixth position of "recipe."

The noise applier selects a character "a" from the dictionary, and generates a changed word "Franch" by replacing the character "e" determined from "French" with the selected character "a." In addition, the noise applier selects a character "i" from the dictionary, and generates a changed word "recipi" by replacing the character "e" determined from "recipe" with the selected character "i."

According to an embodiment, the noise applier adds the character selected from the dictionary to the word selected from the sentence data. For example, the noise applier generates a changed word "Frencha" by adding the character "a" selected from the dictionary to a position next to a character "h" corresponding to a last position of "French." In addition, the noise applier generates a changed word "recipie" by adding the character "i" selected from the dictionary to a position next to a character "p" corresponding to a fifth position of "recipe."

The applying of noise described with reference to FIG. 6 is provided as an example only and, thus, the applying of noise is not limited to the example described in the foregoing.

Figure 7:
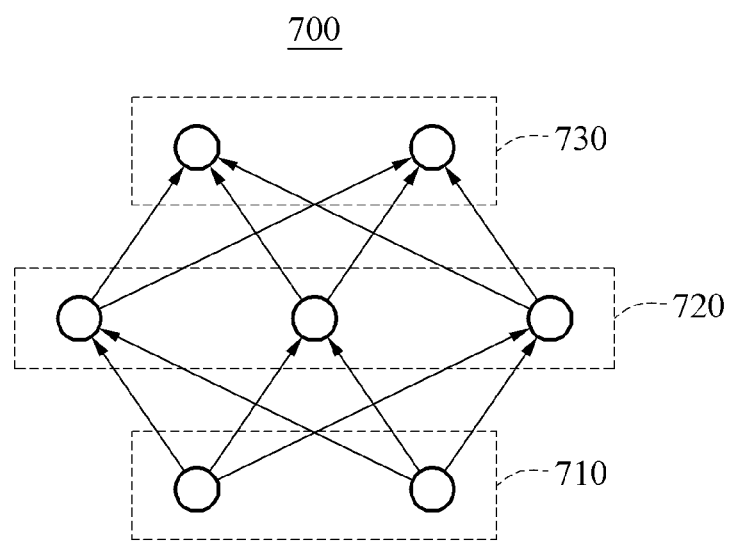
FIGS. 7 through 9 are diagrams illustrating examples of a natural language processing model.
Figure 8:
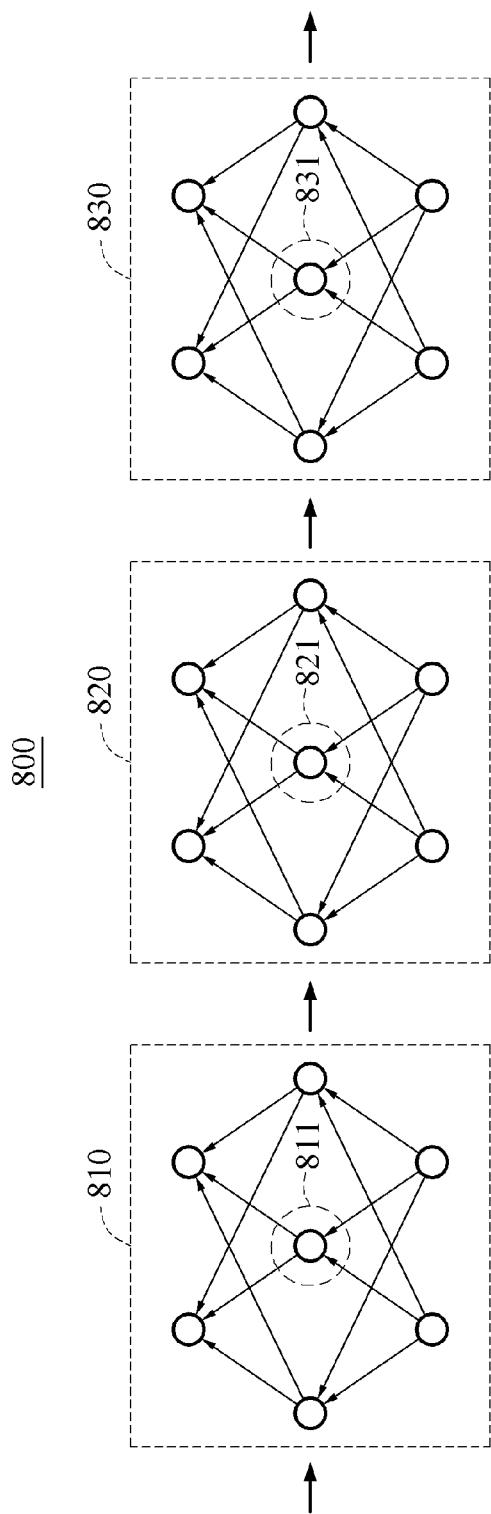
Figure 9:
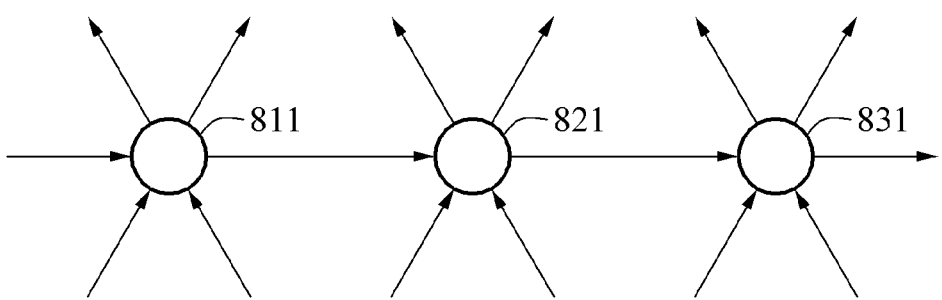

FIGS. 7 through 9 are diagrams illustrating an example of a natural language processing model.

Referring to FIG. 7, a natural language processing model is a model based on a neural network 700.

The neural network 700 includes a plurality of layers. The neural network includes, for example, an input layer 710, a hidden layer 720, and an output layer 730. According to an embodiment, the neural network 700 includes a plurality of hidden layers.

Each of the layers 710 through 730 includes at least one artificial neuron. The artificial neuron of each of the layers 710 through 730 is connected to at least one artificial neuron of a neighboring layer through a connection line. The connection line has a connection weight.

When input data is input to the natural language processing model, forward computation is performed and an output value is generated in the output layer 730. While the input data is being transferred in a direction of the input layer 710→the hidden layer 720→the output layer 730, the connection weight is multiplied or added. Thus, the output value is generated in the output layer 730.

A training apparatus trains the natural language processing model through backpropagation learning. The backpropagation learning refers to a method of calculating an error between a reference value and the output value, propagating the error in a direction of the output layer 730→the hidden layer 720→the input layer 710 of the neural network 700, and updating the connection weight to reduce the error.

For example, in a case that a sentence vector [Searching] [S] ... [Franch][F][r][a][n][c][h] ... [recipe] ... [i][p][e] is input to the natural language processing model and a reference probability is input as a reference value to the natural language processing model, the natural language processing model generates an output value by performing forward computation on the input sentence vector. In an example, the reference probability is a known value. The training apparatus calculates an error indicating a difference between the output value and the reference probability. The training apparatus propagates the error in a direction of the output layer 730→the hidden layer 720→the input layer 710, and updates a connection weight to reduce the error. The training apparatus trains the natural language processing model by repetitively performing the forward computation and the backpropagation learning.

In addition, the training apparatus determines whether "Franch" and "French" appear in a same document, for example, an online news article, in a training process, and/or determines whether there is a case in which "Franch" is expressed as "French." In a case that "Franch" and "French" appear in a same document or "Franch" is expressed as "French," the training apparatus trains the natural language processing model to allow the natural language processing model to predict a concatenation vector of "French" from a concatenation vector of "Franch." That is, the training apparatus trains the natural language processing model so that the natural language processing model recognizes "Franch" as "French."

The natural language processing model may also be a model based on a recurrent neural network (RNN). Hereinafter, an RNN will be described with reference to FIGS. 8 and 9.

Referring to FIG. 8, an RNN 800 is a neural network including a recurrent connection between hidden nodes in different time periods. Dissimilar to a general neural network, the RNN 800 uses an internal memory that processes an input sequence. An output of hidden nodes in a previous time period 810 is connected to hidden nodes in a current time period 820. An output of a hidden node in the current time period 820 is connected to hidden nodes in a subsequent time period 830.

For example, as illustrated in FIGS. 8 and 9, a first hidden node 811 in the previous time period 810, a second hidden node 821 in the current time period 820, and a third hidden node 831 in the subsequent time period 830 are connected as illustrated in FIG. 9. Referring to FIG. 9, an output of the first hidden node 811 is input to the second hidden node 821, and an output of the second hidden node 821 is input to the third hidden node 831.

The training apparatus calculates an error indicating a difference between an output value of the RNN 800 and a reference probability, and trains the natural language processing model by back-propagating the error through a backpropagation through time (BPTT) method.

According to an embodiment, the natural language processing model is a model based on a convolution neural network (CNN).

The natural language processing model trained through the training process described with reference to FIGS. 7 through 9 may recognize "Franch" as "French." Thus, the natural language processing model determines intent information of "Where is a Franch restaurant?" that is not accurately recognized to be "searching for a French restaurant."

Figure 10:
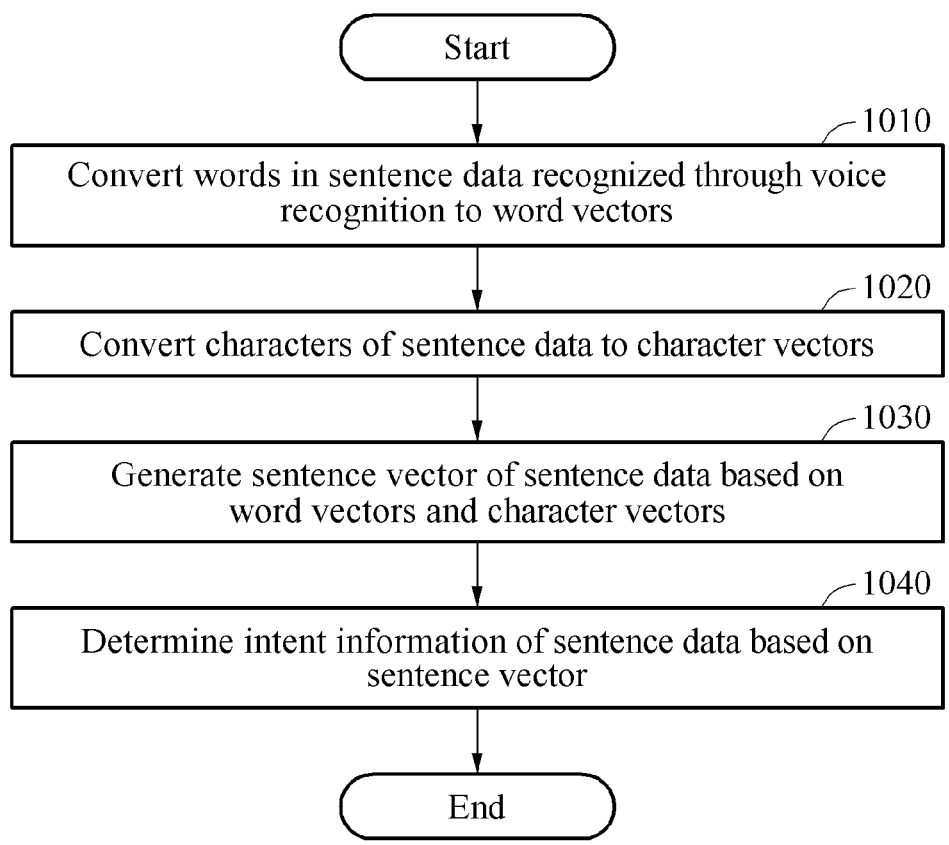
FIG. 10 is a flowchart illustrating an example of a natural language processing method.

FIG. 10 is a flowchart illustrating an example of a natural language processing method.

A natural language processing method to be described hereinafter with referent o FIG. 10 is performed by a structural natural language processing apparatus.

Referring to FIG. 10, in operation 1010, the natural language processing apparatus converts words in sentence data recognized through voice recognition to corresponding word vectors.

In operation 1020, the natural language processing apparatus converts characters of the sentence data to corresponding character vectors.

In operation 1030, the natural language processing apparatus generates a sentence vector of the sentence data based on the word vectors and the character vectors.

In operation 1040, the natural language processing apparatus determines intent information of the sentence data based on the sentence vector.

The descriptions provided with reference to FIGS. 1 through 9 are applicable to the operations described with reference to FIG. 10, and thus a more detailed and repeated description is omitted here for brevity.

Figure 11:
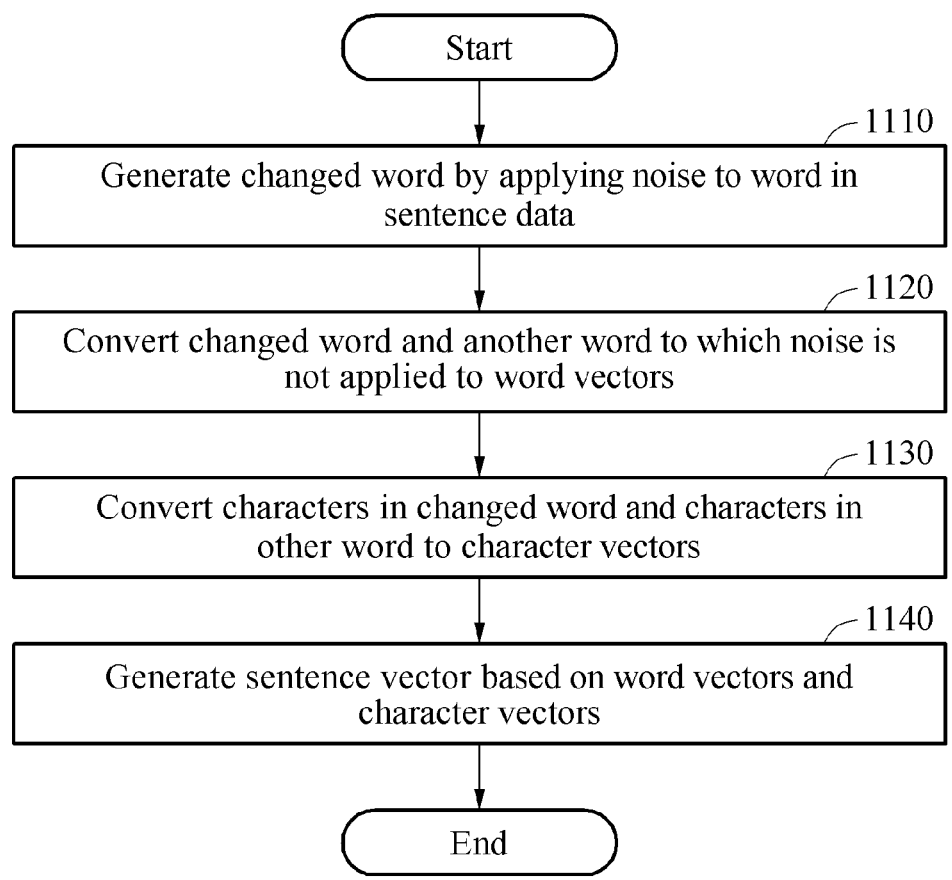
FIG. 11 is a flowchart illustrating another example of a natural language processing method.

FIG. 11 is a flowchart illustrating an example of a training method.

A training method to be described hereinafter with reference to FIG. 11 is performed by a training apparatus.

Referring to FIG. 11, in operation 1110, the training apparatus generates a changed word by applying noise to a word in sentence data. The sentence data is input as training data to the training apparatus.

In operation 1120, the training apparatus converts the changed word and another word, to which noise is not applied, to corresponding word vectors.

In operation 1130, the training apparatus converts characters included in the changed word and characters included in the other word, to which noise is not applied, to corresponding character vectors.

In operation 1140, the training apparatus generates a sentence vector based on the word vectors and the character vectors.

The descriptions provided with reference to FIGS. 1 through 10 are applicable to the operations described with reference to FIG. 11, and thus a more detailed and repeated description is omitted here for brevity.

Figure 12:
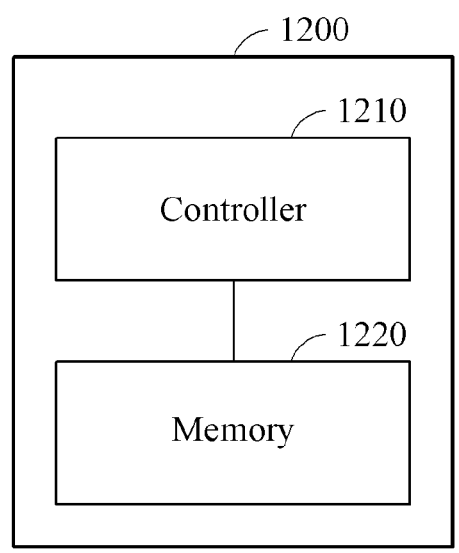
FIG. 12 is a diagram illustrating another example of a natural language processing apparatus.

FIG. 12 is a diagram illustrating another example of a natural language processing apparatus.

Referring to FIG. 12, a natural language processing apparatus 1200 includes a controller 1210 and a memory 1220.

The voice recognizer and/or the natural language analyzer described above may be embodied by the controller 1210.

The controller 1210 converts words in sentence data recognized through voice recognition to corresponding word vectors. The controller 1210 converts characters of the sentence data to corresponding character vectors. The controller 1210 generates a sentence vector of the sentence data based on the word vectors and the character vectors. The controller 1210 determines intent information of the sentence data based on the sentence vector.

The memory 1220 stores at least one instruction associated with the operations of the controller 1210, and/or a natural language processing model.

The descriptions provided with reference to FIGS. 1 through 11 are applicable to the example illustrated in FIG. 12, and thus a more detailed and repeated description is omitted here for brevity.

Figure 13:
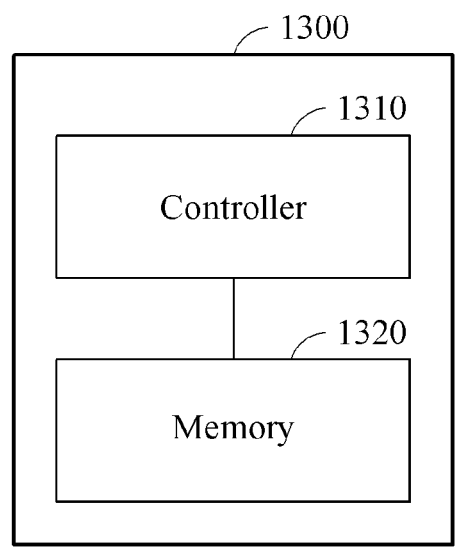
FIG. 13 is a diagram illustrating another example of a training apparatus.

FIG. 13 is a diagram illustrating another example of a training apparatus.

Referring to FIG. 13, a training apparatus 1300 includes a controller 1310 and a memory 1320.

The noise applier, the word embedder, the character embedder, and/or the combiner described with reference to FIGS. 5 and 6 may be embodied by the controller 1310.

The controller 1310 generates a changed word by applying noise to a word in sentence data. The controller 1310 converts the changed word and another word, to which noise is not applied, to corresponding word vectors. The controller 1310 converts characters included in the changed word and characters included in the other word, to which noise is not applied, to corresponding character vectors. The controller 1310 generates a sentence vector based on the word vectors and the character vectors.

The memory 1320 stores at least one instruction associated with the operations of the controller 1310.

The descriptions provided with reference to FIGS. 1 through 12 are applicable to the example illustrated in FIG. 13, and thus a more detailed and repeated description is omitted here for brevity.

The apparatuses, recognizers, appliers, embedders, analyzers, extractors, models, converter$_{[AC4]}$, modules, devices, and other components illustrated in FIGS. 1, 2, 3, 5, 12, and 13 that perform the operations described herein with respect to FIGS. 4, 6, 10, and 11 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 4, 6, 10, and 11. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A natural language processing method, comprising:
receiving a voice signal;
extracting features from the received voice signal;
recognizing a phoneme sequence from the extracted features through an acoustic model;
generating sentence data by recognizing words from the phoneme sequence through a language model;
converting words in the sentence data, to corresponding word vectors;
converting characters in the sentence data to corresponding character vectors;
generating a sentence vector based on the word vectors and the character vectors;
determining intent information of the sentence data based on the sentence vector; and
outputting a control signal corresponding to the intent information to perform an operation by an electronic device.

2. The natural language processing method of claim 1, wherein the generating of the sentence vector comprises:
generating a concatenation vector of each of the words by concatenating a word vector of each of the words and a character vector of each of characters in each of the words; and
generating the sentence vector by concatenating corresponding concatenation vectors of the words.

3. The natural language processing method of claim 1, wherein the converting of the words to the word vectors comprises:
in response to an unlabeled word being among the words, converting a word corresponding to the unlabeled word to a word vector corresponding to an unknown word vector.

4. The natural language processing method of claim 1, wherein the determining of the intent information comprises:
calculating a probability of each of pieces of candidate intent information determined from the sentence vector; and
determining the intent information among the pieces of candidate intent information based on the calculated probability of each of the pieces of candidate intent information.

5. The natural language processing method of claim 1, wherein the determining of the intent information comprises:

determining a target word corresponding to an error word in the sentence data based on a concatenation vector of the error word; and
recognizing the error word as the target word,
wherein the concatenation vector of the error word is generated by concatenating a word vector of the error word and a character vector of each of characters in the error word.

6. The natural language processing method of claim 5, wherein, in response to the error word being an unlabeled word, the word vector of the error word corresponds to an unknown word vector.

7. The natural language processing method of claim 1, wherein the intent information is generated by a natural language processing model receiving the sentence vector.

8. The natural language processing method of claim 7, wherein, in response to the natural language processing model receiving training data including a second word generated by applying noise to a first word, the natural language processing model is trained to recognize the second word as the first word.

9. The natural language processing method of claim 8, wherein the second word is generated by changing a portion of characters in the first word to other characters, or adding another character to the first word.

10. A natural language processing apparatus comprising:
a controller; and
a memory including at least one instruction executable by the controller,
wherein, in response to the instruction being executed by the controller, the controller is configured to:
receive a voice signal,
extract features from the received voice signal,
recognize a phoneme sequence from the extracted features through an acoustic model,
generate sentence data by recognizing words from the phoneme sequence through a language model,
convert words in the sentence data to corresponding word vectors,
convert characters in the sentence data to corresponding character vectors,
generate a sentence vector based on the word vectors and the character vectors,
determine intent information of the sentence data based on the sentence vector, and
output a control signal corresponding to the intent information to perform an operation by an electronic device.

11. The natural language processing apparatus of claim 10, wherein the controller is further configured to:
generate a concatenation vector of each of the words by concatenating a word vector of each of the words and a character vector of each of characters in each of the words; and
generate the sentence vector by concatenating corresponding concatenation vectors of the words.

12. The natural language processing apparatus of claim 10, wherein the controller is further configured to:
in response to an unlabeled word being among the words, convert a word corresponding to the unlabeled word to a word vector corresponding to an unknown word vector.

13. The natural language processing apparatus of claim 10, wherein the controller is further configured to:
calculate a probability of each of pieces of candidate intent information determined from the sentence vector; and determine the intent information among the pieces of candidate intent information based on the calculated probability of each of the pieces of candidate intent information.

14. The natural language processing apparatus of claim 10, wherein the controller is further configured to:
determine a target word corresponding to an error word in the sentence data based on a concatenation vector of the error word; and
recognize the error word as the target word,
wherein the concatenation vector of the error word is generated by concatenating a word vector of the error word and a character vector of each of characters in the error word.

15. The natural language processing apparatus of claim 14, wherein, in response to the error word being an unlabeled word, the word vector of the error word corresponds to an unknown word vector.

16. The natural language processing apparatus of claim 10, wherein the intent information is generated by a natural language processing model receiving the sentence vector.

17. The natural language processing apparatus of claim 16, wherein, in response to the natural language processing model receiving training data including a second word generated by applying noise to a first word, the natural language processing model is trained to recognize the second word as the first word.

18. The natural language processing apparatus of claim 17, wherein the second word is generated by changing a portion of characters in the first word to other characters, or adding another character to the first word.

19. The natural language processing apparatus of claim 10, wherein the controller is further configured to:
receive a voice signal;
extract features from the received voice signal;
recognize a phoneme sequence from the extracted features through an acoustic model; and
generate the sentence data by recognizing words from the phoneme sequence through a language model.

* * * * *